(12) United States Patent
Guan et al.

(10) Patent No.: US 8,391,280 B2
(45) Date of Patent: Mar. 5, 2013

(54) METHOD AND SYSTEM FOR REALIZING NONLOSS TRANSMISSION OF MEDIA STREAM AFTER SWITCHING BETWEEN OPEN CALL AND SECRET CALL

(75) Inventors: Xianfeng Guan, Shenzhen (CN); Haigang Guo, Shenzhen (CN); Jingyue Shen, Shenzhen (CN)

(73) Assignee: ZTE Corporation (CN)

( * ) Notice: Subject to any disclaimer, the term of this patent is extended or adjusted under 35 U.S.C. 154(b) by 361 days.

(21) Appl. No.: 12/673,590

(22) PCT Filed: Dec. 27, 2007

(86) PCT No.: PCT/CN2007/003829
§ 371 (c)(1),
(2), (4) Date: Feb. 16, 2010

(87) PCT Pub. No.: WO2009/033344
PCT Pub. Date: Mar. 19, 2009

(65) Prior Publication Data
US 2012/0026990 A1    Feb. 2, 2012

(30) Foreign Application Priority Data
Sep. 13, 2007  (CN) .......................... 2007 1 0121778

(51) Int. Cl.
H04L 12/66  (2006.01)

(52) U.S. Cl. ....................................... 370/354; 370/352

(58) Field of Classification Search ........... 370/352–354
See application file for complete search history.

(56) References Cited

U.S. PATENT DOCUMENTS

| 6,574,213 B1 * | 6/2003 | Anandakumar et al. ...... 370/349 |
| 2006/0025140 A1 * | 2/2006 | Bales et al. .................... 455/445 |
| 2006/0115088 A1 * | 6/2006 | Valentine et al. ............. 380/270 |

FOREIGN PATENT DOCUMENTS

| CN | 1289515 A | 3/2001 |
| CN | 1753348 A | 3/2006 |
| CN | 1816172 A | 8/2006 |
| CN | 101119525 A | 2/2008 |

\* cited by examiner

Primary Examiner — Phuc Tran
(74) Attorney, Agent, or Firm — Brooks Kushman P.C.

(57) ABSTRACT

A method for realizing non-loss transmission of media stream after switching between the open call and the secret call, the method includes the steps: after the base station receiving the message of switching from the open call to the secret call from the communication terminal, inserting a special media frame in the media stream and transmitting it to the media gateway; the media gateway judging whether checking the special media frame according to the form of the load-bearing of the media stream's incoming and outgoing or the form of the media's coding decoding, whether detect the special media frame or not, the media gateway transmitting the media stream from the incoming to the outgoing. When the special media frame is detected, deciding to transmit directly or run an PCM adaptation process in 64 kbps/56 kbps according to the form of the coding decoding.

14 Claims, 2 Drawing Sheets

METHOD AND SYSTEM FOR REALIZING NONLOSS TRANSMISSION OF MEDIA STREAM AFTER SWITCHING BETWEEN OPEN CALL AND SECRET CALL

TECHNICAL FIELD

The present invention relates to a technology for lossless transmission of a media stream in mobile communication field, especially a method and system for implementing lossless transmission of a media stream after switching from a plain-call to a cipher-call.

BACKGROUND OF THE RELATED ART

In a communication network, the construction cost and maintenance cost of a private network is very high, the construction period is very long, and the private network doesn't have universality. Therefore, construction of a private network at present generally uses an overlay network mode, i.e., special devices satisfying a private requirement are overlaid on an universal communication network to implement functions of the private network. For example, an encrypted communication private network may be constructed on the basis of a CDMA (Code Division Multiple Access) communication network, and the CDMA network only implements transmission of encrypted voice and doesn't implement decryption of the encrypted voice.

In the communication field, with the evolution of the 3G (Third Generation) mobile communication, the architecture of a CDMA mobile communication network is divided into two parts: a radio access network and a core network.

As shown in FIG. 1, the MSC (Mobile Switching Center) has evolved into two parts: a MSCe (Mobile Switching Center Emulation) 101 and a MGW (Media Gate Way) 103, so that controlling and bearing are separated, and the TDM (Time Division Multiplex) circuit switching technology is replaced with the packet network technology. Wherein, the MSCe 101 provides the function of call control and mobility management, the MGW 103 provides the function of media control, provides transmission resource and has the function of media stream manipulation. The MSCe 101 interchanges a signaling stream 105 with the base station 102, MGW 103 and tandem exchange 104, and a media stream 106 is interchanged among the base station 102, MGW 103 and tandem exchange 104.

The MSCe 101 and MGW 103 are two network elements belonging to the core network, wherein the MGW 103 implements conversion between different encoding-decoding formats of different packet domains (i.e. IP domains) or those of a packet domain and a circuit domain (i.e. TDM domain). Such conversion of encoding-decoding format is referred to as RTO (Remote Transcode Operation), and during the RTO, the compression, encoding and decoding of a media stream will cause impairment of the media stream. If the encoding-decoding formats of both ends in a packet domain are the same, then conversion of encoding-decoding format is not needed, which is referred to as TrFO (Transcoder Free Operation), and during the TrFO, the compression, encoding and decoding of a media stream will not cause impairment of the media stream.

An encrypted call from a private terminal to another, i.e. the end-to-end encrypted call, is referred to as a cipher-call; accordingly, the end-to-end non-encrypted call is referred to as a plain-call. A User may initiate a call by a plain-call, and when conversation begins, press a button for switching from a plain-call to a cipher-call on a private terminal to switch the plain-call to a cipher-call, and this process is referred to as plain-call to cipher-call switch.

In a traditional circuit domain, all media streams are borne in the circuit domain, without being encoded or decoded, so there is no operation that will impair the media streams. However, between different packet domains or in a 3G network with packet domain and circuit domain hybrid networking, if RTO of a media stream is performed after entering the cipher-call stage, the compression, encoding and decoding of the media stream will cause impairment of the media stream, and thus reliability of the transmission will be affected.

For example, if transparent lossless transmission of encrypted voice information is implemented within a CDMA network, the encrypted voice information is not decrypted to achieve reliable transmission of the encrypted communication. After a private terminal switches from a plain-call to a cipher-call, if RTO of the media stream is needed, the compression, encoding and decoding of the media stream will cause impairment of the media stream, and thus greatly affect the transmission reliability.

From the discussion above it can seen that the existing technology of media stream transmission after switching from a plain-call to a cipher-call has shortcomings, and has inconvenience and defects in actual use, thus needs to be improved.

SUMMARY OF THE INVENTION

In regard to the above defects, the destination of the present invention is to provide a method and system for implementing lossless transmission of a media stream after switching from a plain-call to a cipher-call, in order to implement loss transmission of a media stream if a plain-call has been switched to a cipher-call in a wireless communication system.

To achieve the destination, the present invention provides a method for implementing lossless transmission of a media stream after switching from a plain-call to a cipher-call, applied in a system comprising a base station, a media gateway and a communication terminal, the method comprising the following steps of:

A. after the base station receives a plain-call to cipher-call switch message for switching from a plain-call to a cipher-call from the communication terminal, inserting a special media frame indicating that the plain-call to cipher-call switch has been performed into the media stream and then sending the media stream to the media gateway;

B. the media gateway determining whether to detect the special media frame or not according to incoming and outgoing media bearing modes of the media stream, or according to incoming and outgoing media bearing modes and media encoding-decoding formats, and the media gateway passing through the media stream from the incoming to the outgoing regardless of whether the special media frame is detected or not to be detected.

Furthermore, the step B comprises the step: if the special media frame is detected by the media gateway, adapting code packets of the media stream to a 64 kbps/56 kbps Pulse Code Modulation (PCM) code stream and then transmitting the PCM code stream to the outgoing.

Furthermore, after the base station receives the plain-call to cipher-call switch message in step A, at least one Double Tone Multi-Frequency (DTMF) signal frame is inserted into the media stream being transmitted, the DTMF signal frame comprising any DTMF signal event frame of the DTMF signal.

Furthermore, the step B comprises the step of:

B1. if the incoming and outgoing of the media stream are both a circuit domain media bearing mode, in the cipher-call stage, the media gateway directly transmitting the media stream from the incoming to the outgoing, without detecting the special media frame.

Furthermore, the step B comprises the step of:

B2. if the incoming and outgoing of the media stream are both a packet domain media bearing mode and the media encoding-decoding formats of the incoming and outgoing are the same, in the cipher-call stage, the media gateway directly transmitting the media stream from the incoming to the outgoing, without detecting the special media frame.

Furthermore, the step B comprises the step of:

B3. if the incoming and outgoing of the media stream are both a packet domain media bearing mode and the media encoding-decoding formats of the incoming and outgoing are different, in conversation stage, the media gateway detecting the special media frame, and when the special media frame is detected, first shutting down a voice enhancement function for the media stream; and if the encoding-decoding format of one end of the call is found the same as the encoding-decoding format of the communication terminal and the encoding-decoding format of the other end of the call is an audio standard G.711 format, then adapting code packets in the encoding-decoding format of the one end of the call to the PCM code stream in the G.711 format according to an agreed format in cipher-call communication.

Furthermore, in the step B3, if the media gateway finds that the encoding-decoding format of the other end of the call is not the G.711 format, then converts the encoding-decoding format to the G.711 format, and then executes the step, which is executed in the case that the encoding-decoding format of the other end of the call is the G.711 format, in the step B3.

Furthermore, the step B comprises:

B4. if one of the incoming and outgoing of the media stream is a packet domain media bearing mode, and the other is a circuit domain media bearing mode, in conversation stage, the media gateway detecting the special media frame, and when the special media frame is detected, first shutting down a voice enhancement function for the media stream; and if the encoding-decoding format of one end of the call is found the same as the encoding-decoding format of the communication terminal and the encoding-decoding format of the other end of the call is an audio standard G.711 format, then adapting code packets in the encoding-decoding format of the one end of the call to the PCM code stream in the G.711 format according to an agreed format in cipher-call communication.

Furthermore, in the step B4, if the media gateway finds the encoding-decoding format of the other end of the call is not the G.711 format, then converts the encoding-decoding format to the G.711 format, and then executes the step, which is executed in the case that the encoding-decoding format of the other end of the call is the G.711 format, in the step B4.

To achieve the above destination, the present invention provides a system for implementing lossless transmission of a media stream, comprising a communication terminal, a base station and a media gateway, wherein, the communication terminal, connecting with the base station in a wireless manner, is used to send a plain-call to cipher-call switch message for switching from a plain-call to a cipher-call to the base station;

the base station, connecting with the media gateway, is configured to insert a special media frame into the media stream and then send the media stream to the media gateway after receiving the plain-call to cipher-call switch message;

the media gateway is configured to determine whether to detect the special media frame or not according to the incoming and outgoing media bearing modes of the media stream, or according to the incoming and outgoing media bearing modes and media encoding-decoding formats, and the media gateway passes through the media stream from the incoming to the outgoing regardless of whether the special media frame is detected or not to be detected.

Furthermore, when the special media frame is detected by the media gateway, code packets of the media stream are adapted to a 64 kbps/56 kbps Pulse Code Modulation (PCM) code stream and then transmitted to the outgoing.

Furthermore, after the base station receives the plain-call to cipher-call switch message, at least one Double Tone Multi-Frequency (DTMF) signal frame is inserted into the media stream being transmitted, the DTMF signal frame comprising any DTMF signal event frame of the DTMF signal.

Furthermore, if the incoming and outgoing of the media stream are both a circuit domain media bearing mode, in conversation stage, the media gateway doesn't detect the special media frame, but directly transmits the media stream from the incoming to the outgoing.

Furthermore, if the incoming and outgoing of the media stream are both a packet domain media bearing mode and the media encoding-decoding formats of the incoming and outgoing are the same, in conversation stage, the media gateway doesn't detect the special media frame, but directly transmits the media stream from the incoming to the outgoing.

Furthermore, if the incoming and outgoing of the media stream are both a packet domain media bearing mode and the media encoding-decoding formats of the incoming and outgoing are different, in conversation stage, the media gateway detects the special media frame, and when the special media frame is detected, first shuts down a voice enhancement function for the media stream; if the encoding-decoding format of one end of the call is found the same as the encoding-decoding format of the communication terminal and the encoding-decoding format of the other end of the call is an audio standard G.711 format, then adapts code packets in the encoding-decoding format of the one end of the call to the PCM code stream in the G.711 format according to an agreed format in cipher-call communication; if the encoding-decoding format of the other end of the call is found not to be the G.711 format, then converts the encoding-decoding format to the G.711 format, and then performs the adaptation.

Furthermore, if one of the incoming and outgoing of the media stream is a packet domain media bearing mode and the other is a circuit domain media bearing mode, in conversation stage, the media gateway detects the special media frame, and when the special media frame is detected, first shuts down a voice enhancement function for the media stream; and if the encoding-decoding format of one end of the call is found the same as the encoding-decoding format of the communication terminal and the encoding-decoding format of the other end of the call is an audio standard G.711 format, then adapts code packets in the encoding-decoding format of the one end of the call to the PCM code stream in the G.711 format according to an agreed format in cipher-call communication; if the encoding-decoding format of the other end of the call is found not to be the G.711 format, then converts the encoding-decoding format to the G.711 format, and then performs the adaptation.

With the above technical scheme of the present invention, not only lossless transmission of encrypted voice can be implemented in the current exchange, but also other network elements of rear exchanges on the transmission path are informed that lossless transmission is required, thereby ensuring the normality of the encrypted communication, and further guaranteeing the reliability of the transmission of the encrypted information.

PREFERRED EMBODIMENTS OF THE PRESENT INVENTION

To clarify the purpose, technical scheme and advantages of the present invention, the present invention is further described in detail with the accompanying drawings and embodiments. It should be understood that the embodiments described herein are considered in all respects as illustrative of the present invention but not restrictive.

The basic conception of the present invention is: during transmission of media streams, the media gateway directly passes through the media stream that doesn't need conversion of encoding-decoding format to the outgoing, and for the media stream that needs conversion of encoding-decoding format, the media gateway attempts to detect a special media frame in the media stream, and after the special media frame is detected, determines whether adaptation is needed rather than encoding and decoding the voice. If the adaptation is needed, the media stream is adapted to 64 kbps/56 kbps Pulse Code Modulation (PCM), and then transmitted to the outgoing; in this way, the media stream will not be impaired during the transmission.

Figure 1:
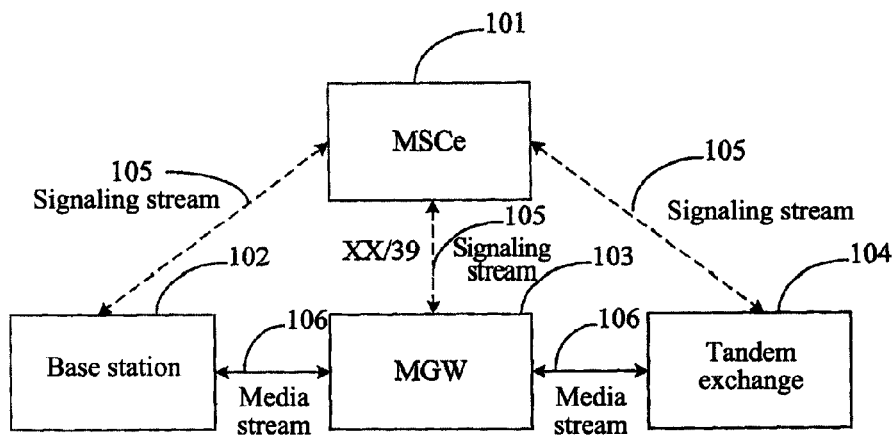
FIG. 1 is a diagram illustrating the connections among devices in a packet domain in a current CDMA network.
Figure 2:
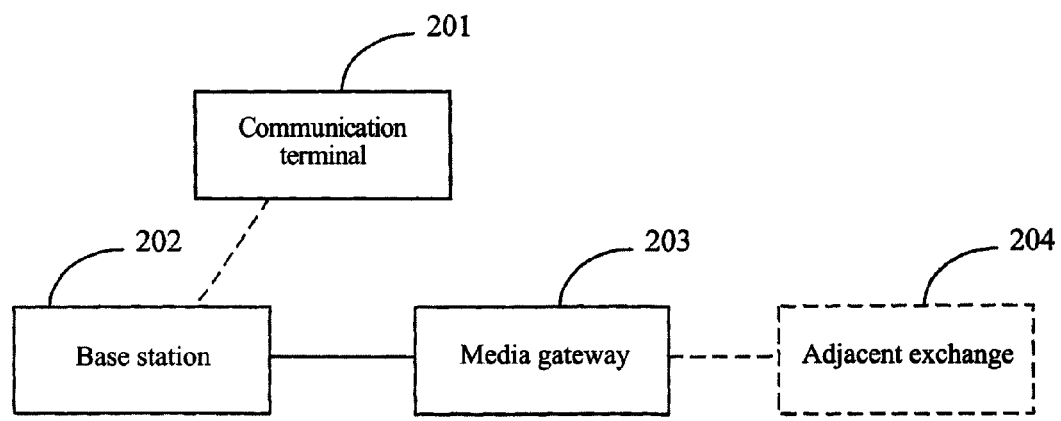
FIG. 2 is a schematic diagram illustrating the structure of a system implementing lossless transmission of a media stream after switching from a plain-call to a cipher-call in accordance with the present invention.

FIG. 2 is a schematic diagram illustrating the structure of a system implementing lossless transmission of a media stream after switching from a plain-call to a cipher-call in accordance with the present invention; the system is preferably a CDMA network system, comprising at least a communication terminal 201, a base station 202 and a media gateway 203, wherein:

The communication terminal 201, connecting with the base station 202 in a wireless manner, is used to send a plain-call to cipher-call switch message to the base station 202 to switch from a plain-call to a cipher-call.

The base station 202, connecting with the media gateway 203, is configured to insert a special media frame into the media stream and then send the media stream to the media gateway 203 after receiving the plain-call to cipher-call switch message; preferably, the special media frame is used to indicate that the plain-call to cipher-call switch has been performed, and may be one or more DTMF frames.

The media gateway 203 is configured to determine whether to detect the special media frame or not according to the incoming and outgoing media bearing modes of the media stream, or according to the incoming and outgoing media bearing modes and media encoding-decoding formats of the media stream, and the media gateway 203 passes through the media stream from the incoming to the outgoing regardless of whether the special media frame is detected or not to be detected; in other words, if the special media frame is not to be detected, the media stream is directly transmitted to an adjacent exchange 204 (as shown by the dashed line and dashed line box in FIG. 2), and if the special media frame is detected, then the media stream is transmitted to the adjacent exchange after being adapted to 64 kbps/56 kbps PCM according to the encoding-decoding formats of both ends of the call. Since the difference between the incoming and outgoing media bearing modes or media encoding-decoding formats of the media stream directly affects whether impairment of the media stream transmission will be caused, in the present invention, whether to detect the special media frame inserted into the media stream is determined according to the difference between the incoming and outgoing media bearing modes or media encoding-decoding formats of the media stream. The media bearing modes comprise a packet domain (i.e. IP domain) media bearing mode and a circuit domain (i.e. TDM domain) media bearing mode, and the determination of whether to detect the special media frame or not by the media gateway 203 specifically comprises the following four situations:

(1) if the media gateway 203 is in the plain-call stage, and the incoming and outgoing media bearing modes of the media stream are both the circuit domain media bearing mode, then no processing is performed after the media stream enters the cipher-call stage, the media gateway 203 doesn't need to detect the special media frame, and media stream information is passed through before and after the plain-call to cipher-call switch.

(2) if the media gateway 203 is in the plain-call stage, the incoming and outgoing media bearing mode of the media stream are both the packet domain media bearing mode, and the encoding-decoding formats of the both ends are the same, i.e., the incoming and outgoing are both a TrFO (Transcoder Free Operation) call of packet domain, then conversion of encoding-decoding format is not needed, no processing is performed after entering the cipher-call stage, media gateway 203 doesn't need to detect the special media frame, and media stream information is passed through before and after the plain-call to cipher-call switch.

(3) if the media gateway 203 is in the plain-call stage, the incoming and outgoing media bearing mode of the media stream are both the packet domain media bearing mode, and the encoding-decoding formats of the both ends are different, i.e., the incoming and outgoing are both a RTO (Remote Transcoder Operation) call of packet domain, then the media gateway 203 needs to detect the special media frame, and after entering the cipher-call stage, when the special media frame is detected by the media gateway 203, the voice enhancement function for the media stream is shut down and only 64 kbps/56 kbps PCM adaptation is performed, without encoding and decoding processing, so as to ensure lossless transmission of the code packets.

(4) if the media gateway 203 is in the plain-call stage, and as for the media bearing mode of the media stream, the incoming media bearing mode is the packet domain media bearing mode and the outgoing media bearing mode is the circuit domain media bearing mode; or the incoming media bearing mode is the circuit domain media bearing mode and the outgoing media bearing mode is the packet domain media bearing mode, the media gateway 203 needs to detect the special media frame, and after entering the cipher-call stage, when the special media frame is detected by the media gateway 203, the voice enhancement function for the media stream is shut down and only 64 kbps/56 kbps PCM adaptation/extraction is performed, without encoding and decoding processing, so as to ensure lossless transmission of the code packets.

Figure 3:
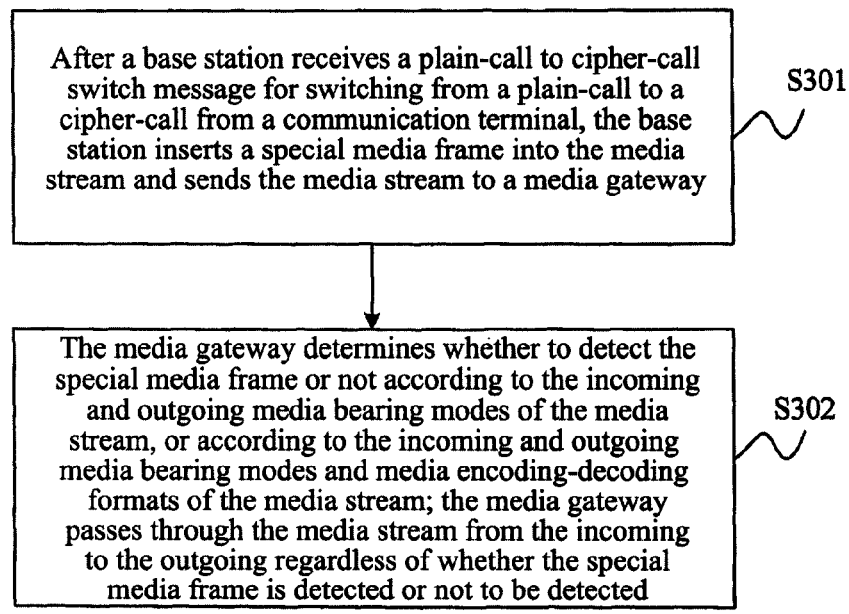
FIG. 3 is a flow chart of a method for implementing lossless transmission of a media stream after switching from a plain-call to a cipher-call in accordance with the present invention.

FIG. 3 is a flow chart of a method for implementing lossless transmission of a media stream after switching from a plain-call to a cipher-call in accordance with the present invention;

the method is applied in a system, shown in FIG. 2, comprising a base station 202, a media gateway 203 and a communication terminal 201, and the method specifically comprises the following steps:

S301: when the base station 202 receives a plain-call to cipher-call switch message for switching from a plain-call to a cipher-call from the communication terminal 201, the base station 202 inserts a special media frame into the media stream and sends the media stream to the media gateway 203;

In the embodiment discussed above, when the base station 202 receives the plain-call to cipher-call switch message from the communication terminal 201, the base station 202 inserts one or more DTMF (Double Tone Multi-Frequency) frames into the media stream being transmitted; the DTMF frame may be any of the DTMF event frames shown in Table 1

TABLE 1

Frequencies corresponding to Double Tone Multi-Frequency frames

| Low Frequency (Hz) | High Frequency (Hz) | | | |
|---|---|---|---|---|
| | 1209 | 1336 | 1447 | 1633 |
| 697 | 1 | 2 | 3 | A |
| 770 | 4 | 5 | 6 | B |
| 852 | 7 | 8 | 9 | C |
| 941 | * | 0 | # | D |

Table 1 shows frequencies corresponding to Double Tone Multi-Frequency frames in the present invention, wherein, the first row is the high frequencies of the DTMF frames, the first column is the low frequencies, and the others are DTMF event frames, comprising totally 16 DTMF frames, which are 0~9, *, #, A~D. The DTMF has been gradually applied in touch-tone telephones around the world, and since the DTMF provides a higher dial speed, the DTMF has quickly replaced the dial pulse signaling used in a traditional rotary telephone. In recent years, the DTMF has also been applied in interactive control, such as language menu, language mail, telephone bank and ATM terminals etc. Generating and detecting DTMA signaling through software is a valuable engineering application. During encoding and decoding, the DTMF codec converts keystrokes or digital information to double tone signals and sends them, and during decoding, detects the existence of keystrokes or digital information in the received DTMF signals. Each key on the telephone keyboard is determined uniquely by a row frequency and column frequency shown in Table 1. The encoding and decoding scheme of DTMF doesn't require large amount of calculation, and can be implemented easily at the computing speed of the present computer.

In the current step, after the communication terminal 201 establishes a plain-call, when the user presses the button for switching the plain-call to a cipher-call, the communication terminal 201 sends a plain-call to cipher-call switch message to the base station 202; when the base station 202 receives the plain-call to cipher-call switch message sent by the communication terminal 201, the base station 202 inserts one DTMF frame into the media stream being transmitted. Inserting the DTMF frame into the media stream is implemented by the control center of the base station 202. For example, the control center of the base station inserts a DTMF frame with a 20 ms duration into the media stream; since the communication terminal 201 generally provides buttons of 0~9, *, #, but doesn't provide buttons of A~D, to avoid the situation that the user involuntarily misdial a key and initiates the lossless transmission of encrypted voice, DTMF frames of A~D, such as DTMF C frame, are adopted preferably to set as the initialization of the lossless transmission of encrypted voice.

S302: the media gateway 203 determines whether to detect the special media frame or not according to the incoming and outgoing media bearing modes of the media stream, or according to the incoming and outgoing media bearing modes and media encoding-decoding formats of the media stream, and regardless of whether the special media frame is detected or not to be detected, the media gateway 203 passes through the media stream from the incoming to the outgoing.

If the incoming and outgoing media bearing modes of the media stream are both the circuit domain media bearing mode, or the incoming and outgoing of the media stream are both a TrFO call of packet domain, the media gateway 203 doesn't need to detect the special media frame, and directly passes through the entire media stream; if the incoming and outgoing are both a RTO call of packet domain, the media gateway 203 only performs 64 kbps/56 kbps PCM adaptation and doesn't perform encoding and decoding, in order to ensure lossless transmission of the code packets.

In the first embodiment of the present invention discussed above, if the incoming and outgoing of the media stream are both the circuit domain media bearing mode, in the cipher-call stage, the media gateway 203 doesn't detect the special media frame, and passes through the media stream directly from the incoming to the outgoing.

In the second embodiment of the present invention, if the incoming and outgoing of the media stream are both the packet domain media bearing mode, and the media encoding-decoding formats of the incoming and outgoing are the same, i.e., the incoming and outgoing are both a TrFO call of packet domain, in the cipher-call stage, the media gateway 203 doesn't detect the special media frame, and passes through the media stream directly from the incoming to the outgoing.

In the third embodiment of the present invention, the incoming and outgoing of the media stream are both the packet domain media bearing mode, and the media encoding-decoding formats of the incoming and outgoing are different, i.e., the incoming and outgoing are both a RTO call of packet domain. The encoding-decoding type of one end of the RTO call is the same as the encoding-decoding type of the communication terminal 201, noted as CODEC1; the encoding-decoding type of the other end of the RTO call is negotiated with the adjacent exchange 204, noted as CODEC2. In conversation stage, the media gateway 203 needs to detect the special media frame, and when the special media frame is detected by the media gateway 203, the voice enhancement function for the media stream, such as noise reduction, echo cancellation, frame loss compensation etc, is shut down; if the encoding-decoding format of the RTO call is found being converted from CODEC1 to CODEC2, and CODEC2 is G.711 audio standard format, then conversion of the encoding-decoding format from CODEC1 to G.711, as in the plain-call, is no longer performed, but the code packets of CODEC1 are adapted to a 64 kbps/56 kbps PCM code stream in G.711 format according to an agreed format in cipher-call communication, so as to prevent the encrypted code packets from being impaired because of the conversion of encoding-decoding format; if CODEC2 is not the G.711 format, then it is merely needed to convert the encoding-decoding format of CODEC2 to the G.711 format and then execute the above processing. The media gateway 203 transmits the media stream to the outgoing, such as the adjacent exchange 204, through packet domain. In reverse, the media gateway 203 extracts the code packets in CODEC1 format from a 64 kpbs/

56 kbps G.711 code stream received from the adjacent exchange 204, and then sends the code packets to the base station 202.

In the fourth embodiment of the present invention, one of the incoming and outgoing of the media stream is the packet domain media bearing mode, and the other is the circuit domain media bearing mode, the encoding-decoding type of one end of the RTO call is the same as the encoding-decoding type of the communication terminal 201, noted as CODEC1; the other end is TDM and the encoding-decoding type is G.711. In conversation stage, the media gateway 203 needs to detect the special media frame, and when the special media frame is detected by the media gateway 203, the special media frame is converted to a DTMF tone in G.711 format and the voice enhancement function for the media stream, such as noise reduction, echo cancellation, frame loss compensation etc, is shut down. If the encoding-decoding format of the RTO call is found being converted from CODEC1 to G.711, conversion of the encoding-decoding format from CODEC1 to G.711, as in the plain-call, is no longer performed, but the code packets of CODEC1 are adapted to a 64 kbps/56 kbps PCM code stream in G.711 format according to an agreed format in cipher-call communication, so as to prevent the encrypted code packets from being impaired because of the conversion of encoding-decoding format. If CODEC2 is not the G.711 format, then it is merely needed to convert the encoding-decoding format of CODEC2 to the G.711 format and then execute the above processing. The media gateway 203 transmits the media stream to the outgoing, such as the adjacent exchange 204, through time division multiplexing (TDM). In reverse, the media gateway 203 extracts the code packets in CODEC1 format from a 64 kpbs/56 kbps G.711 code stream received from the adjacent exchange 204, and then sends the code packets to the base station 202.

After receiving the media stream, the adjacent exchange 204 also determines whether detection of the special media frame is needed. If the detection is needed and the special media frame DTMF C is detected, the voice enhancement function for the media stream, such as noise reduction, echo cancellation, frame loss compensation etc, is shut down, and different processing is performed according to the encoding-decoding types of both ends of the call. If the encoding-decoding type of one end is CODEC1, the same operation is performed as the media gateway 203, otherwise, the bearing format of the exchange is converted automatically to the G.711 format, and the received media stream is transmitted to the outgoing entirely in lossless and transparent manner. Such processing is performed on the whole path of the call to ensure the lossless transmission of the encrypted code packets of the communication terminal 201 to a gateway exchange that performs encryption processing (referred to as encryption gateway exchange for short) at the other end of the call, and the encryption gateway exchange performs the processing from a plain-call to a cipher-call, and thereby ensures the normality of the conversation.

To sum up, in the present invention, when a plain-call is switched to a cipher-call, the base station inserts a special media frame into the media stream and sends it to a media gateway, the media gateway determines whether to detect the special media frame or not according to the incoming and outgoing media bearing modes or media encoding-decoding formats of the media stream, and regardless of whether the special media frame is detected or not to be detected, the media gateway passes through the media stream from the incoming to the outgoing; if the special media frame is detected by the media gateway, only 64 kbps/56 kbps PCM adaptation is performed, without encoding and decoding processing, so as to ensure transparent and lossless transmission of the encrypted code packets of the communication terminal 201 on the path of the call. With the technical scheme, not only lossless transmission of encrypted voice can be implemented in the current exchange, but also other network elements of rear exchanges on the transmission path are informed that lossless transmission is required, thereby ensuring the reliability of the transmission of the encrypted information.

Of course, the present invention may have many other embodiments, and without departing from the spirit and essence of the present invention, a person skilled in the art may make various corresponding variations and transformations according to the present invention, but such variations and transformations shall all belong to the scope protected by the appended claims of the present invention.

INDUSTRIAL APPLICABILITY

The present invention may be applied in a system comprising a base station, a media gateway and a communication terminal, so as to implement lossless transmission of a media stream after a wireless terminal user switches a plain-call to a cipher-call, to ensure reliability of the transmission of the encrypted information, and to provide value-added experiences for the quality of service of the wireless terminal user.

What we claim is:

1. A method for implementing lossless transmission of a media stream after switching from a plain-call to a cipher-call, applied in a system comprising a base station, a media gateway and a communication terminal, the method comprising the following steps of:

A. after the base station receives a plain-call to cipher-call switch message for switching from a plain-call to a cipher-call from the communication terminal, inserting a special media frame indicating that the plain-call to cipher-call switch has been performed into the media stream and then sending the media stream to the media gateway;

B. the media gateway determining whether to detect the special media frame or not according to incoming and outgoing media bearing modes of the media stream, or according to incoming and outgoing media bearing modes and media encoding-decoding formats; and C. the media gateway passing through the media stream from the incoming to the outgoing regardless of whether the special media frame is detected or not to be detected;

wherein, in the step B, if the special media frame is detected by the media gateway, adapting code packets of the media stream to a 64 kbps/56 kbps Pulse Code Modulation (PCM) code stream and then transmitting the PCM code stream to the outgoing media stream.

2. The method of claim 1, further comprising:
   after the base station receives the plain-call to cipher-call switch message in step A, inserting at least one Double Tone Multi-Frequency (DTMF) signal frame into the media stream being transmitted, the DTMF signal frame comprising any DTMF signal event frame of the DTMF signal.

3. The method of claim 1, wherein, the step B further comprises the step of:
   B1. if the incoming and outgoing of the media stream are both a circuit domain media bearing mode, in the cipher-call stage, the media gateway directly transmitting the media stream from the incoming to the outgoing, without detecting the special media frame.

4. The method of claim 1, wherein, the step B further comprises the step of:
B2. if the incoming and outgoing of the media stream are both a packet domain media bearing mode and the media encoding-decoding formats of the incoming and outgoing are the same, in the cipher-call stage, the media gateway directly transmitting the media stream from the incoming to the outgoing, without detecting the special media frame.

5. The method of claim 1, wherein, the step B further comprises the step of:
B3. if the incoming and outgoing of the media stream are both a packet domain media bearing mode and the media encoding-decoding formats of the incoming and outgoing are different, in conversation stage, the media gateway detecting the special media frame, and when the special media frame is detected, first shutting down a voice enhancement function for the media stream; and if the encoding-decoding format of one end of the call is found the same as the encoding-decoding format of the communication terminal and the encoding-decoding format of the other end of the call is an audio standard G.711 format, then adapting code packets in the encoding-decoding format of the one end of the call to the PCM code stream in the G.711 format according to an agreed format in cipher-call communication.

6. The method of claim 5, further comprising:
in the step B3, if the media gateway finds that the encoding-decoding format of the other end of the call is not the G.711 format, then converting the encoding-decoding format to the G.711 format, and then executing the step, which is executed in the case that the encoding-decoding format of the other end of the call is the G.711 format, in the step B3.

7. The method of claim 1, wherein, the step B further comprises:
B4. if one of the incoming and outgoing of the media stream is a packet domain media bearing mode, and the other is a circuit domain media bearing mode, in conversation stage, the media gateway detecting the special media frame, and when the special media frame is detected, first shutting down a voice enhancement function for the media stream; and if the encoding-decoding format of one end of the call is found the same as the encoding-decoding format of the communication terminal and the encoding-decoding format of the other end of the call is an audio standard G.711 format, then adapting code packets in the encoding-decoding format of the one end of the call to the PCM code stream in the G.711 format according to an agreed format in cipher-call communication.

8. The method of claim 7, further comprising:
in the step B4, if the media gateway finds the encoding-decoding format of the other end of the call is not the G.711 format, then converting the encoding-decoding format to the G.711 format, and then executing the step, which is executed in the case that the encoding-decoding format of the other end of the call is the G.711 format, in the step B4.

9. A system for implementing the method of claim 1, comprising:
the communication terminal, connecting with the base station in a wireless manner, and used to send a plain-call to cipher-call switch message for switching from a plain-call to a cipher-call to the base station;
the base station, connecting with the media gateway, and configured to insert a special media frame into the media stream and then send the media stream to the media gateway after receiving the plain-call to cipher-call switch message;
the media gateway, configured to determine whether to detect the special media frame or not according to the incoming and outgoing media bearing modes of the media stream, or according to the incoming and outgoing media bearing modes and media encoding-decoding formats, the media gateway passing through the media stream from the incoming to the outgoing regardless of whether the special media frame is detected or not to be detected;
wherein, when the special media frame is detected by the media gateway, code packets of the media stream are adapted to a 64 kb s/56 kb s Pulse Code Modulation PCM code stream and then transmitted to the outgoing media stream.

10. The system of claim 9, wherein, after the base station receives the plain-call to cipher-call switch message, at least one Double Tone Multi-Frequency (DTMF) signal frame is inserted into the media stream being transmitted, the DTMF signal frame comprising any DTMF signal event frame of the DTMF signal.

11. The system of claim 9, wherein, if the incoming and outgoing of the media stream are both a circuit domain media bearing mode, in conversation stage, the media gateway doesn't detect the special media frame, but directly transmits the media stream from the incoming to the outgoing.

12. The system of claim 9, wherein, if the incoming and outgoing of the media stream are both a packet domain media bearing mode and the media encoding-decoding formats of the incoming and outgoing are the same, in conversation stage, the media gateway doesn't detect the special media frame, but directly transmits the media stream from the incoming to the outgoing.

13. The system of claim 9, wherein, if the incoming and outgoing of the media stream are both a packet domain media bearing mode and the media encoding-decoding formats of the incoming and outgoing are different, in conversation stage, the media gateway detects the special media frame, and when the special media frame is detected, first shuts down a voice enhancement function for the media stream; if the encoding-decoding format of one end of the call is found the same as the encoding-decoding format of the communication terminal and the encoding-decoding format of the other end of the call is an audio standard G.711 format, then adapts code packets in the encoding-decoding format of the one end of the call to the PCM code stream in the G.711 format according to an agreed format in cipher-call communication; if the encoding-decoding format of the other end of the call is found not to be the G.711 format, then converts the encoding-decoding format to the G.711 format, and then performs the adaptation.

14. The system of claim 9, wherein, if one of the incoming and outgoing of the media stream is a packet domain media bearing mode and the other is a circuit domain media bearing mode, in conversation stage, the media gateway detects the special media frame, and when the special media frame is detected, first shuts down a voice enhancement function for the media stream; and if the encoding-decoding format of one end of the call is found the same as the encoding-decoding format of the communication terminal and the encoding-decoding format of the other end of the call is an audio standard G.711 format, then adapts code packets in the encoding-decoding format of the one end of the call to the PCM code stream in the G.711 format according to an agreed format in cipher-call communication; if the encoding-decoding format of the other end of the call is found not to be the G.711 format, then converts the encoding-decoding format to the G.711 format, and then performs the adaptation.

* * * * *

UNITED STATES PATENT AND TRADEMARK OFFICE
CERTIFICATE OF CORRECTION

| | |
|---|---|
| PATENT NO. | : 8,391,280 B2 |
| APPLICATION NO. | : 12/673590 |
| DATED | : March 5, 2013 |
| INVENTOR(S) | : Xianfeng Guan et al. |

It is certified that error appears in the above-identified patent and that said Letters Patent is hereby corrected as shown below:

In the Claims:

Column 12, Line 12, Claim 9:

Delete "media stream adapted to a 64 kb s/56 kb s" and
Insert -- media stream are adapted to a 64kbps/56kbps --

Signed and Sealed this
Second Day of July, 2013

Teresa Stanek Rea
*Acting Director of the United States Patent and Trademark Office*